United States Patent [19]

Yoon et al.

[11] Patent Number: 5,475,556
[45] Date of Patent: Dec. 12, 1995

[54] APPARATUS FOR DETECTING HIGH IMPEDANCE FAULT

[75] Inventors: Man-Chul Yoon; Myeong-Ho Yoo, both of Daejeon-si, Rep. of Korea

[73] Assignee: Korea Electric Power Corporation, Seoul, Rep. of Korea

[21] Appl. No.: 112,562

[22] Filed: Aug. 26, 1993

Related U.S. Application Data

[63] Continuation-in-part of Ser. No. 708,359, May 31, 1991, abandoned.

[30] Foreign Application Priority Data

Apr. 18, 1991 [KR] Rep. of Korea ............... 1991-6229

[51] Int. Cl.$^6$ ..................... H02H 3/42; H02H 3/26
[52] U.S. Cl. ..................... 361/87; 361/63; 361/78; 324/522
[58] Field of Search ..................... 324/512, 509, 324/525, 520–522; 361/54, 57, 62, 63, 78–80, 87, 93; 364/483, 492

[56] References Cited

U.S. PATENT DOCUMENTS

| | | | |
|---|---|---|---|
| 4,300,182 | 11/1981 | Schweitzer, III | 361/79 |
| 4,432,031 | 2/1984 | Premerlani | 361/63 |
| 4,470,091 | 9/1984 | Sun et al. | 361/79 |
| 4,878,142 | 10/1989 | Bergman et al. | 361/80 |

OTHER PUBLICATIONS

J. Carr, IEEE, Detection of High Impedance Faults on Multi–Grounded Primary Distribution Systems, Apr. 1981.

*Primary Examiner*—A. D. Pellinen
*Assistant Examiner*—Ronald W. Leja
*Attorney, Agent, or Firm*—Chernoff, Vilhauer, McClung & Stenzel

[57] ABSTRACT

An apparatus for detecting differences between zero-sequence current caused by load unbalance and fault current caused by fallen distribution conductors. The apparatus makes it possible to readily check a high impedance fault. The apparatus includes analog-to-digital converters for converting analog A-, B-, C- and neutral phase current signals to digital data, respectively. The apparatus further includes a data processing system for computing even order power, rate of the even order to odd order power, and incremental variance of even order power. The apparatus analyzes the digital data and determines the fault when the computed information is compared with respective setting values and is greater than the setting values.

6 Claims, 2 Drawing Sheets

2

APPARATUS FOR DETECTING HIGH IMPEDANCE FAULT

This application is a continuation-in-part of patent application Ser. No. 07/708,359 filed May 31, 1991, now abandoned.

BACKGROUND OF THE INVENTION

The present invention relates to an apparatus for detecting a high impedance fault on distribution lines, and more particularly to an apparatus for distinguishing between a zero-sequence current caused by load imbalance and a high impedance fault current caused by incompletely fallen conductors in distribution lines in a multi-ground distribution system or a directly grounded distribution system and for supplying a control signal so as to cut off the flow of load current.

Generally, there are two types of power supply systems for providing currents to a load system through distribution lines. One is a three-phase, four-wire distribution system, the other is a three-phase, three-wire directly grounded system. A protective relay in these systems has in the past used an overcurrent relay for detecting the occurrence of a fault caused by a short circuit in the distribution lines, and an overcurrent ground relay for detecting the occurrence of a fault caused by fallen or broken conductors in distribution lines. Since these relays can block the supply of power which is normally provided to power lines or power equipment, such relays have been commonly used only to prevent an electric shock and to prevent damage to power equipment.

Another type of relay is provided for cutting off the power supply upon detection of a fault where the fault current caused by fallen conductors is compared with a threshold current value that is one-and-a-half times or two times the load current. A fault is detected only when the fault current is greater than the threshold current value.

An overcurrent ground relay is sometimes provided for detecting a zero-sequence current caused by a load imbalance which resembles the type of fault current which characteristically results from fallen conductors, thus detecting a fault on distribution lines.

In a directly-grounded distribution system utilizing such a relay system, fluctuations in load power often occur under normal operation due to an imbalance in the currents in respective phases so that the remaining current appears in a zero-sequence line or a neutral phase line. An amount of the remaining current IN can be obtained from the following relation.

$$IN = Ia + Ib + Ic = 310 \quad (1)$$

whereas Ia, Ib, Ic and IN are A-phase, B-phase, C-phase and neutral-phase current signals, respectively. Accordingly, when an amount of a normal zero-sequence current IN is greater than the threshold value of an overcurrent ground relay for detecting fallen conductors in distribution lines, the relay system malfunctions. Therefore, the relay system has to operate far below the threshold current value so as to prevent malfunction of the system.

The detection of faults in distribution lines is commonly done by devices which measure overcurrents caused by faults. Such devices include a reclosing system including overcurrent relays, overcurrent ground relays, reclosures, or fuses. While these devices interrupt fault currents, they must not trip when normal emergency load currents, such as transient overcurrents, which can be caused by inrush events or load pickup upsurges. Because of this, the threshold of the operation must be set at a relatively high current value to avoid tripping during normal operations. Practically, overcurrent relays in each phase are usually set to operate at 125–200% of maximum load. Therefore, these overcurrent ground relays allow some large neutral currents due to this unbalance. Such conventional art is disclosed in "Detection of high impedance faults on multi-grounded primary distribution system" J. Carr, IEEE Transactions of Power Apparatus and Systems, Vol. PAS-100, pp. 2008–2016, April, 1981.

Although conventional overcurrent devices do detect many faults in the distribution line, these devices still do not detect a large number of faults with very low fault currents (in this case the magnitude of fault currents is nearly 0 to 100A). These faults frequently occur when a fallen distribution conductor comes into contact with a high impedance surface such as an asphalt road, macadam, gravel, sand, or a tree. The fault currents of these high impedance faults are below the threshold of the operation of the fault clearing device. Moreover, since the occurrences of these high impedance faults are increasing due to the frequent use of electrically insulated wire, a better ground relay system for readily detecting the fault is needed.

SUMMARY OF THE INVENTION

In order to solve the problems of the prior art ground relay system, an object of the present invention is to provide an apparatus for detecting a high impedance fault caused by fallen distribution conductors, in which a digital protection relay device having an analog-to-digital converter (ADC) to convert distribution line current to digital signals, and a data processing system for computing an even order power and an odd order power, a ratio of the even order power to the odd order power and an incremental variance of sequential even order powers, comparing these computed values with respective threshold values, and detecting a fault when at least one of these respective computed values toggles a counter past a predetermined threshold. The counter threshold can be set to trip the relay at any desired value.

To achieve this object, the present invention is characterized in that an apparatus for detecting a high impedance fault caused by fallen distribution conductors comprises an input signal transducer for converting A-, B-, C- and neutral-phase current signals on distribution lines to respective voltage signals; a filter for filtering the respective voltage signals to obtain a predetermined band of frequency signals of even order harmonics; a multiplexer for sequentially selecting the respective frequency signals corresponding to each phase; a sample-and-hold network for sampling 64 points of the output signal of the multiplexer corresponding to each cycle of the respective current signals, an ADC for converting the sampled signal from the sample-and-hold network to digital data and for producing a conversion end signal when completed; a DMA signal producer for producing a direct memory access request signal in response to the conversion end signal; a timing pulse generator for providing timing pulses to the multiplexer, sample-and-hold network and ADC, respectively; a buffer for temporarily storing the digital data; a DMA controller for producing a direct memory access acknowledge signal in response to the request signal and for controlling data transmission between the buffer and a storage device in order that the stored data of the buffer is stored in the storage device; a memory storage device for storing the stored data of the buffer, other data processing information, a high impedance fault detection algorithm and programs for controlling all functions of the apparatus; and a central processing unit for controlling these functions by performing computer programs and producing data necessary for detection of the high impedance fault by performing a fault detection algorithm.

The fault detection algorithm includes the steps of: computing an even order power and odd order power by processing the data corresponding to a cycle signal which are stored in the storage device, wherein the even order power is obtained from the following relation:

$$\sum_{i=0}^{31} \{f(i) + f(i+31)\}^2$$

and the odd order power is obtained from the following relation:

$$\sum_{i=0}^{31} \{f(i) - f(i+31)\}^2$$

where i is the sequential number of sampled data corresponding to 32 points of the positive half-cycle, and i[ml]m-is a sequential number of sampled data corresponding to 32 points of the negative half-cycle; computing a ratio of the even order power to the odd order power, computing an incremental variance between an even order power in a first cycle with the corresponding even order power in the previous cycle; comparing the even order power with a first threshold value and increasing by one the contents of a first counter when the even order power is greater than the first threshold value; comparing the of the even/odd ratio order powers with a second threshold value and increasing by one the contents values of a second counter when the ratio is greater than the second threshold value; comparing the incremental variance with a third threshold value and increasing by one the contents of a third counter when the variance is greater than the third threshold value; increasing by one the contents of a fourth counter only when at least one of the three previous counters is increased and comparing the contents of the fourth counter with a fourth threshold value relating to detection of the high impedance fault; and determining the high impedance fault when the contents of the fourth counter exceed the fourth threshold value, and providing a control signal to a reclosing system in order to cut off power supply of the load system.

The system includes an I/O interface comprising a common communication port, keyboard and display monitor, wherein the control signal and the stored data of the storage device are provided to a peripheral system through the communication port so that the operator can check the operating condition of the apparatus and all the threshold values and the function control signal is provided from the peripheral system through the communication port.

The present invention will become more apparent from the following embodiment described with reference to the accompanying drawings and adapted for use as apparatus for detecting a high impedance fault.

DETAILED DESCRIPTION OF THE PRESENT INVENTION

Figure 1:
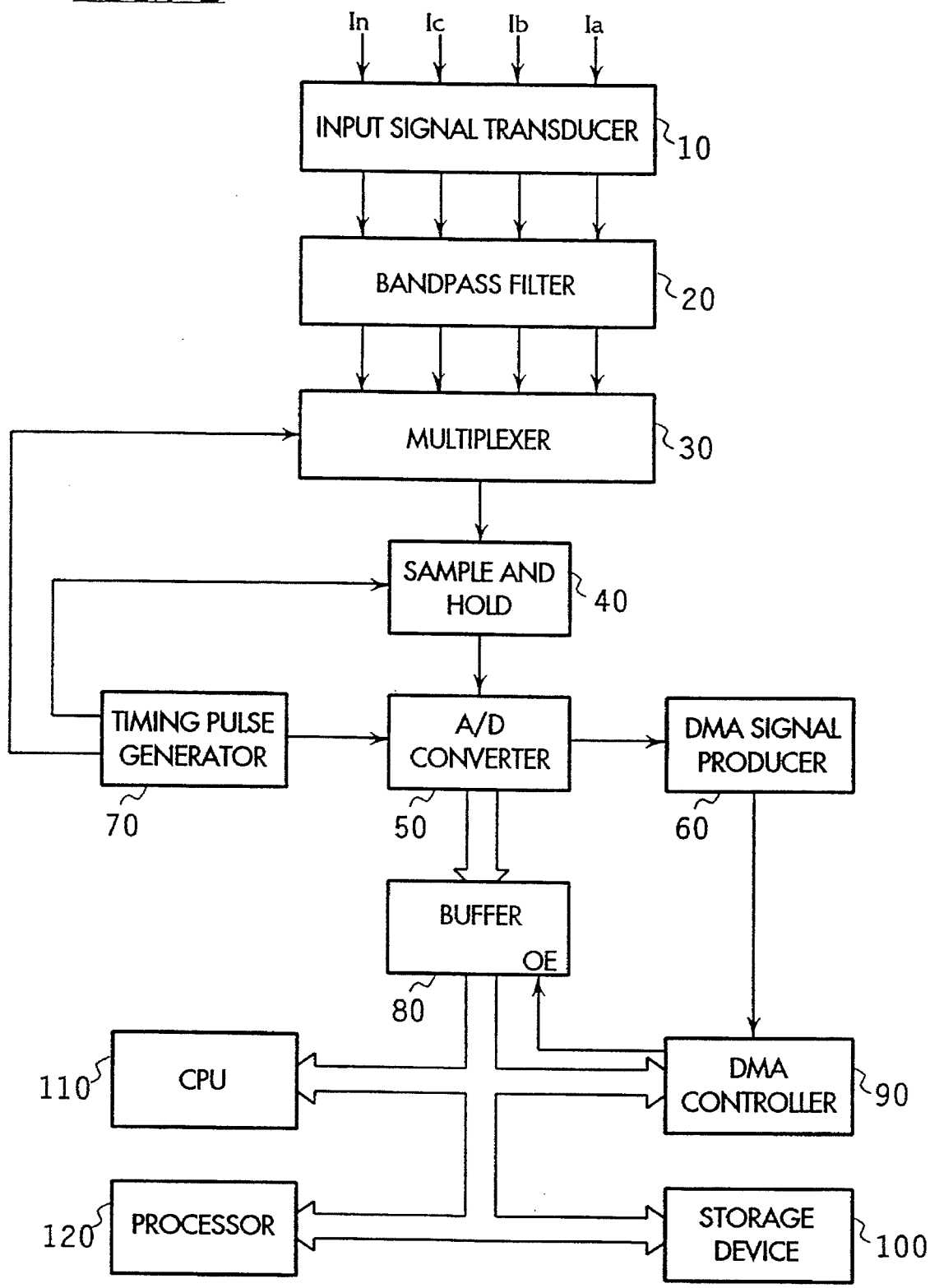
FIG. 1 is a block diagram showing an apparatus for detecting a high impedance fault according to the present invention.

FIG. 1 shows a circuit diagram of an apparatus for detecting a high impedance fault in accordance with the present invention. Referring now to FIG. 1, the invention is embodied in an apparatus which has a data acquisition part in which input current signals from distribution lines are converted to digital data, and a fault detection part in which the acquired digital data are analyzed by a fault detecting algorithm which detects the occurrence of a high impedance fault caused by fallen distribution conductors.

An input signal transducer 10 comprises a plurality of current transducers which are provided to receive three-phase current signals and neutral-phase current signals Ia, Ib, Ic and In from distribution lines and convert these signals to voltage signals, respectively. The voltage signals are input to a band pass filter 20 which filters so as to detect only even order harmonics in the range of 360 Hz to 1920 Hz. Output signals from the filter 20 are input to a multiplexer 30 and thus are sequentially selected.

The selected signal of the multiplexer 30 is applied to a sample-and-hold network 40 in order to sample 64 points in one cycle. The selected signal represents a current waveform of the even order harmonics. The sample-and-hold network 40 holds temporarily a sampled signal thereof until completion of a previous signal converting operation in an ADC 50 so as to prevent a converting error caused within the ADC 50 when a back signal of the sampled sequential signals is input to the ADC 50 before completion of a fore signal conversion. In this way, the sequential output signal of the sample-and-hold network 40 is provided to the ADC 50 for converting to digital data. In addition, output data from the ADC 50 are stored in a buffer 80. The timing of the multiplexer 30, the sample-and-hold 40, and the ADC 50 are controlled by a timing pulse generator 70.

The ADC 50 has a digital filter such as a photo coupler for filtering the digital data and to eliminate noise.

As soon as the ADC 50 has completed the converting operation, a conversion end signal STS is provided from the ADC 50 and is applied to a DMA signal producer 60. A DMA request signal DMAREQ is provided from the signal producer 60 and is applied to a DMA controller 90. A DMA acknowledge signal DMAACK then is provided from the DMA controller 90 and is applied to an enable terminal OE of the buffer 80. On receiving the acknowledge signal, the digital data stored in the buffer 80 are output and are stored through a data bus in a storage device 100.

The data stored in the storage device 100 are digital data containing even order harmonics corresponding to A-, B-, C- and neutral-phase currents, respectively. The DMA term as described above means a direct memory access in computer systems.

The storage device 100 has a random access memory for saving the output data of the buffer 80, the resulting data of a central processing unit 110, a read only memory for saving all programs to control overall functions by means of the central processing unit, and a fault signal detecting algorithm for detecting a high impedance fault caused by fallen distribution conductors as will be described below.

Figure 2:
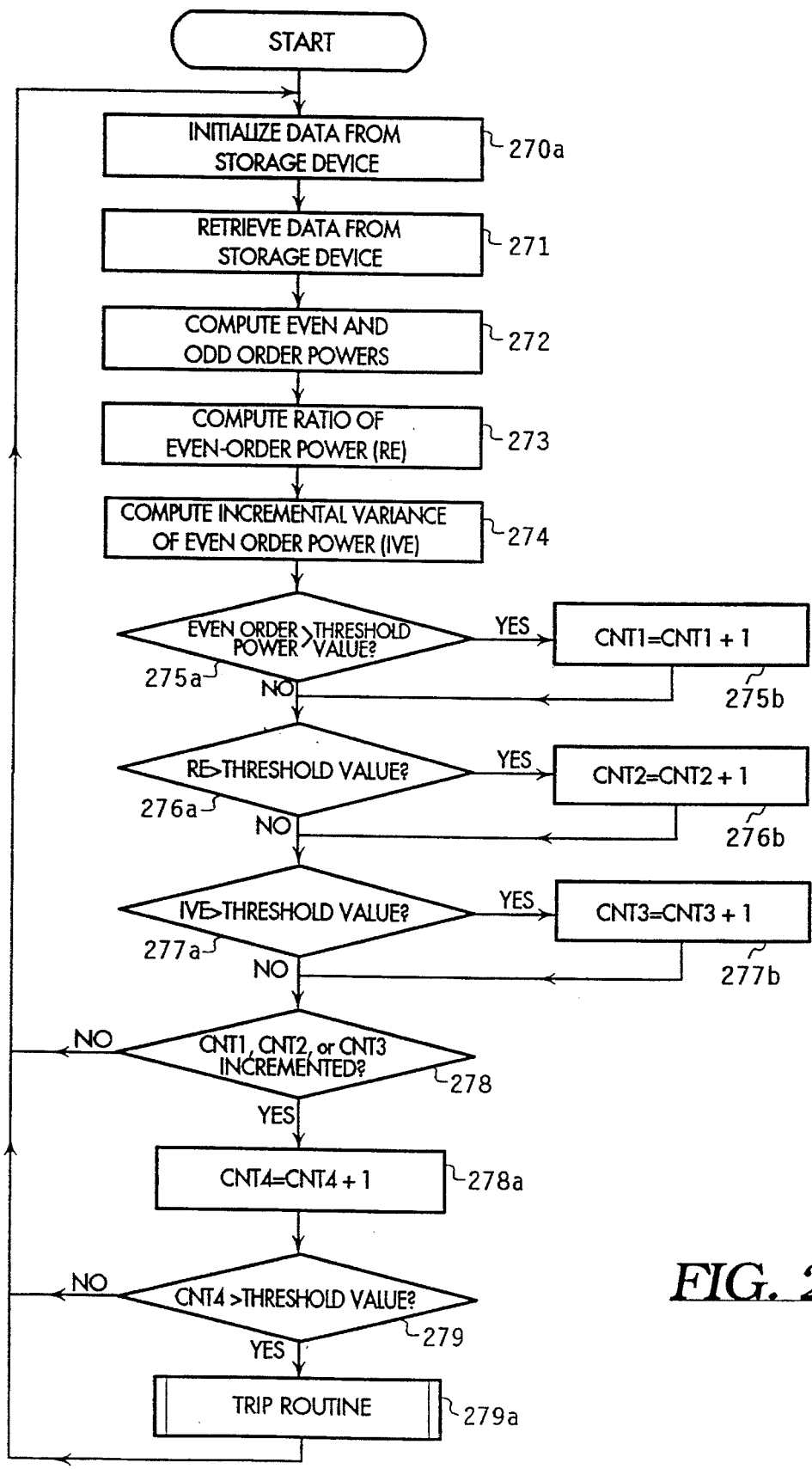
FIG. 2 is a detailed flow chart showing a fault detection routine performed by a central processing unit.

The operation of the central processing unit 110 of FIG. 1 will now be described with reference to the flow chart of FIG. 2. The flow chart of FIG. 2 shows a fault signal detecting algorithm for processing the stored data of the storage device 100 by means of the processing unit and detecting a high impedance fault due to fallen distribution line conductors.

Turning to FIG. 1, the DMA controller 90 as previously described controls data transmission between the storage device 100 and the buffer 80, or the storage device and a peripheral system (not shown). The fault signal detection port analyzes data of the storage device by means of the fault signal detecting algorithm performed by the central processing unit 110, detects a fault and transmits a trip signal to a reclosing system in order to block the supply of power on distribution lines.

The fault signal detecting algorithm is a means for analyzing the stored data of the device 100, computing an even order power and an odd order power, computing a ratio of the even order power to the odd order power and computing an incremental variance between a fore even order power and a back even order power, then comparing this computed data with predetermined threshold values indicative of a high impedance fault, thereby detecting a fault signal caused by fallen distribution conductors.

The data corresponding to one cycle of each phase signal are fetched from the device 100 and are divided into two groups of data of two half-cycles. One is a data group of the positive half-cycle in one cycle of the input current signals, and the other is a data group of the negative half-cycle.

If data corresponding to each sampling point of the positive half-cycle in one cycle is added to data corresponding to each sampling point of the negative half-cycle in the one cycle, an even order power can be obtained. On the other hand, if data corresponding to each sampling point of the positive half-cycle is subtracted from data corresponding to each sampling point of the negative half-cycle, an odd order power also can be obtained. For instance, at 60 Hz frequency the even order power is obtained such that data existing at an 8.3 msec difference between the positive half-cycle and negative half-cycle are added to each other and squared. If the data are subtracted from each other and squared, the odd order power is obtained. Expressions computing these powers are as follows:

$$Peven = \sum_{i=0}^{31} \{f(i) + f(i+31)\}^2 \quad (2)$$

$$Podd = \sum_{iK=0}^{31} \{f(i) - f(i+31)\}^2 \quad (3)$$

whereas Peven is even order power, Podd is odd order power, i is the sequential number of sampled data points corresponding to 32 points of the positive half-cycle, and i[ml]m-is the sequential number of sampled data corresponding to 32 points of the negative half-cycle.

FIG. 2 illustrates in flow chart form the fault detecting procedure. In step 270a, the DMA controller is initialized. Next, the data of the device 100 are fetched in step 271 and are provided to the data processing unit 110. Next in step 272 an even order power and an odd order power are computed. The even order power and odd order power are computed by the above-described expressions (2), (3) and the DMA controller proceeds to step 273 to compute the ratio of the even order power to the odd order power. The ratio can be obtained for the case that the even order power (Peven) is divided by the odd order power (Podd). Next, after computing the ratio the controller proceeds to step 274 where an incremental variance between two sequential even order powers corresponding to sequential cycles is obtained, and the controller proceeds to step 275a.

In step 275a, it is determined whether the even order power Peven is larger than a first threshold value indicative of a fault on distribution lines. With respect to the value of the first threshold, the inventor has conducted experiments wherein distribution lines of 22.9 KV were caused to fall on earth in order to analyze characteristics of the arc current signal in the distribution lines. It was found that the even order power Peven, associated with the high impedance fault condition, is 14 to 40 times that of a normal condition. Thus, a first threshold value may be selected in the range of 12 to 40 times normal Peven. If Peven exceeds the first threshold value, the controller proceeds to step 275b to increase by one the contents of first counter CNT1.

If an amount of the even order power is not greater than the first threshold value, then the controller proceeds to step 276a to determine if the ratio of the even order power to the odd order power RE is greater than a second threshold value also indicative of a possible fault. The inventors have determined that when a high impedance fault arises on distribution lines, odd order harmonics in the arc current signal of the distribution lines are hardly increased. According to the experiments of a fallen 22.9 KV distribution line, the ratio of the even order power to the odd order power under a high impedance fault condition is 2 to 10 times higher than that of a normal condition. Thus, the second threshold value may be selected in the range of 2 to 10. If the ratio is greater than the second threshold value, the controller proceeds to step 276b to increase by one the contents of a second counter CNT2.

If the ratio of even order power to odd order power is not greater than the second threshold, then the controller proceeds to step 277a to determine if the incremental variance IVE is greater than a third threshold value for the fault detection. The even order power may be obtained from event periods of the arc current signal in order to obtain an incremental variance of the even order power. In the inventors' experiments, the incremental variance of 10 event periods of arc current signal under high impedance fault is 10 times more than that of normal condition. A threshold value with respect to the incremental variance may be selected in the range of 10 more than normal. In step 277a, if the amount of the incremental variance is greater than the third threshold value, then the controller proceeds to step 277b to increase by one the contents of a third counter CNT3.

If none of the three counters CNT1, CNT2 or CNT3 have been increased (i.e., the respective signals do not exceed the first, second or third threshold values), then program control is looped back to 270a.

On the other hand, if any one of the counters CNT1, CNT2 or CNT3 is actually incremented then a fourth counter CNT4 is incremented in step 278a. The incrementing of the fourth counter CNT4 indicates that an even order harmonic aberration relating to a high impedance fault caused by fallen conductors on distribution lines has occurred.

Next, it is determined in step 279 whether the contents of the fourth counter CNT4 are greater than a fourth threshold value for the fault detection. Experimentation has determined that a suitable value for the fourth threshold is 20 counts. If so, then the controller proceeds to step 279a to perform a trip routine. On the other hand, if not, the controller loops back to the beginning of step 270a.

Accordingly, when at least one of the counters CNT1, CNT2 and CNT3 is incremented, the fourth counter CNT4 continues to count, at least approaching the fourth threshold value. If after approximately 30 cycles of the respective input current signals the counter has not exceeded the fourth threshold value, it may be cleared. Afterwards, the counter CNT4 continues to count when even order harmonic events occur in the next predetermined number of cycles. Thus, digital data corresponding to the input current signals of one cycle are analyzed and information of even order harmonics relating to the high impedance fault are detected, so that the value of the counter CNT4 is increased. Each time a counter CNT1, CNT2 or CNT3 is incremented, an event has occurred which could mean that a fault is present. If enough of these occur, CNT4 will count past its threshold and trigger the reclosing system. The choice of number of events needed to trigger CNT4 maybe set by the user depending upon the level of sensitivity desired.

In step 279a, a control signal from the central processing unit 110 performing the fault signal detecting algorithm is sent to a reclosing system in order to cut off the power supply to the distribution lines.

In order to improve the capability of the fault signal algorithm, the apparatus according to the present invention further comprises a signal processing processor 120 for performing high speed multiplication. The processor 120 and the processing unit 110 can hold in common the storage device 100 and can fetch in real time the stored data of the device 100.

In addition, the apparatus of the present invention may have a configuration in which the counters CNT1, CNT2, CNT3 and CNT4 are hardware, but also a configuration in which the counters are software, using predetermined areas of the storage device 100 as the four count buffers.

The signal processing processor has a read-only memory for storing a number of programs, and a random access memory for storing data for multiplication and the resulting data of the multiplication. The signal for controlling the processor 120 is provided by the processing unit 110, the data for processing in the processor are provided by the random access memory of the storage device 100 and are stored in random access memory controlled by the processor 120. The processor thus can fetch the data stored in the memory and can multiply in high speed.

The apparatus according to the present invention can readily detect a high impedance fault caused by the incompletely fallen conductors in distribution lines and thus can prevent accidents due to the high impedance fault. In addition, the apparatus can transmit a control signal to a reclosing system in order to block the supply of power to the distribution lines so that a general protection relay system can be provided for detecting a high impedance fault and transmitting a control signal to a reclosing system. Moreover, the apparatus can analyze A-, B-, C- and neutral-phase currents from distribution lines and can detect a high impedance fault due to the incompletely fallen conductors, and thus the fault can be distinguished from some fault in any feeder. Also, the apparatus can readily determine whether a certain line of the distribution lines has fallen to ground.

While this invention has been particularly shown and described with respect to this preferred embodiment, it should be understood by those skilled in the art that changes maybe made in the form and detail without departing from the scope and spirit of the invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A protective system for shutting off power to one or more power distribution lines in the event of a fault condition comprising:
   (a) network means for monitoring current on at least one three-phase distribution line, including band pass filter means for isolating harmonic signals representing the even order harmonics of current in said line;
   (b) analog-to-digital converter means for converting said harmonic signals to digital signals;
   (c) computing means for computing even order power values and odd order power values from said digital signals and for determining variations between selected parameters of said even and odd order power values and respective predetermined threshold values;
   (d) counter means responsive to said variations determined by said computing means for accumulating a count value up to a predetermined threshold count value; and
   (e) power interruption means for shutting off power to the distribution line in response to the accumulation of a count value that meets or exceeds the threshold count value.

2. The protective system of claim 1 wherein f(i) is a sequential number of sampled data of a position half-cycle and f(i+31) is a sequential number of sampled data of a negative half-cycle of a cycle of said current, and the even order power value of each cycle is determined by the formula $$\sum_{i=0}^{31} \{f(i) + f(i+31)\}^2$$

and the odd order power value of each cycle is determined by the formula $$\sum_{i=0}^{31} \{f(i) - f(i+31)\}^2$$

3. The protective system of claim 2 wherein, for each cycle, one of said selected parameters comprises a ratio of the even order power value to the odd order power value.

4. The protective system of claim 3 wherein, for each cycle, one of said selected parameters is an amplitude of the even order power value.

5. The protective system of claim 2 wherein one of said selected parameters is an incremental variation between data points representing a first cycle and corresponding data points representing a previous cycle of current on the distribution line.

6. A protective system for shutting off power to one or more power distribution lines in the event of a fault condition comprising:
   (a) network means for monitoring current on at least one three-phase distribution line, including band pass filter means for isolating harmonic signals representing the even order harmonics of current in said line;
   (b) analog-to-digital converter means for converting said harmonic signals to digital signals, said digital signals having positive half-cycles and negative half-cycles;
   (c) even order power computing means for computing even order power values from said digital signals by squaring the sum of sequentially sampled data of the negative half-cycles and sequentially sampled data of the positive half-cycles;

(d) odd order power computing means for computing odd order power values from said digital signals by squaring the difference between sequentially sampled data of the positive half-cycles and sequentially sampled data of the negative half cycles;

(e) computing means for determining variations between selected parameters of said even and odd order power values and respective predetermined threshold values;

(f) counter means responsive to said variations determined by said computing means for accumulating a count value up to a predetermined threshold count value; and (g) power interruption means for shutting off power to the distribution line in response to the accumulation of a count value that meets or exceeds the threshold count value.

* * * * *

UNITED STATES PATENT AND TRADEMARK OFFICE
CERTIFICATE OF CORRECTION

PATENT NO. : 5,475,556
DATED : December 12, 1995
INVENTOR(S) : Yoon et al.

It is certified that error appears in the above-identified patent and that said Letters Patent is hereby corrected as shown below:

Column 3, line 26, change "i[m|]m-is" to --i+31 is--;

Column 3, line 34, delete "of the" before "even";

Column 4, line 19, change "In" to --IN--;

Column 5, line 51, change "i[m|]m-is" to --i+31 is--;

Column 7, line 13, change "maybe" to --may be--;

Column 7, line 59, change "maybe" to --may be--;

Column 8, line 26, change "position" to --positive--; and

Column 9, line 6, change "half cycles" to --half-cycles--.

Signed and Sealed this

Third Day of September, 1996

Attest:

BRUCE LEHMAN

Attesting Officer       Commissioner of Patents and Trademarks